(12) United States Patent
Cai

(10) Patent No.: US 7,089,959 B2
(45) Date of Patent: Aug. 15, 2006

(54) TIMING REGULATOR FOR OUTDOOR GAS APPARATUS

(76) Inventor: An Cai, No 9, Branch Lane 37, Lane 199, Wuzhou Road, Hongkou Area, Shanghai (CN)

( * ) Notice: Subject to any disclaimer, the term of this patent is extended or adjusted under 35 U.S.C. 154(b) by 328 days.

(21) Appl. No.: 10/705,353

(22) Filed: Nov. 10, 2003

(65) Prior Publication Data
US 2005/0098219 A1    May 12, 2005

(51) Int. Cl.
*F16K 31/48* (2006.01)

(52) U.S. Cl. .............................. 137/624.11; 137/460
(58) Field of Classification Search .......... 137/624.11, 137/460; 239/69
See application file for complete search history.

(56) References Cited

U.S. PATENT DOCUMENTS 4,579,142 A * 4/1986 Jung-Chao ................. 137/460
4,633,905 A * 1/1987 Wang ..................... 137/624.11
4,807,664 A * 2/1989 Wilson et al. ........... 137/624.11
6,755,213 B1 * 6/2004 Lai ......................... 137/624.11

* cited by examiner

*Primary Examiner*—Kevin Lee

(74) *Attorney, Agent, or Firm*—Raymond Y. Chen; David and Raymond Patent Group

(57) ABSTRACT

A timing regulator, having an operation temperature of the timing regulator from −40° C. to 55° C., includes a valve body which has a gas discharging end for connecting to an outdoor gas apparatus and a safety gas connector provided at a gas inletting end for securely connecting to a gas source, a gas controller including a safety device for blocking the gas flow passing through the valve body when a gas pressure at the gas discharging end of the valve body is higher than a safety gas pressure at the gas inletting end thereof, and a timer device disposed in the valve body for selectively regulating the gas flow via a preset time frame.

29 Claims, 2 Drawing Sheets

TIMING REGULATOR FOR OUTDOOR GAS APPARATUS

BACKGROUND OF THE PRESENT INVENTION

1. Field of Invention

The present invention relates to a gas controller, and more particularly to a timing regulator especially for an outdoor gas apparatus, such as a gas barbecue grill, wherein the timing regulator has a rigid and durable structure that allows to be operated within an operation temperature from −40° C. to 55° C.

2. Description of Related Arts

A safety gas controller is generally incorporated with a gas apparatus to prevent gas leakage from a gas source. U.S. Pat. No. 4,579,142, generally suggests a safety gas controller comprising a flow channel having a gas outlet and a gas inlet connected to the gas source, and a safety valve disposed in the gas channel to control a flow of gas to pass through the flow channel from the gas inlet to the gas outlet. The safety valve comprises a ball member rotatably disposed within the flow channel in such a manner that when the gas flow is greater than a safety flow, the gas flow pushes the ball member to sealedly close the gas outlet so as to block the gas flow to pass through the flow channel. However, the safety gas controller has several drawbacks.

The safety gas controller must incorporate with a push stem for driving the ball member from the shut-off position back to a normal flow position. When the ball is sat at the gas outlet to block the gas flow, the push stem must be depressed to move the ball member back to its original position. In other words, the safety gas controller requires a manual operation to release shut-off position of the ball member at the gas outlet.

Accordingly, the safety gas controller further comprises a gas flow indicator incorporated therewith to illustrate the pressure of the gas flow. However, the gas flow indicator requires a small amount of the gas flow passing therethrough for measurement, such that the gas flow may accidentally leaked through the gas flow indicator.

In addition, the safety gas controller can only stop the gas flow through the pressure difference between the gas inlet and the gas outlet. Therefore, the safety gas controller cannot shut off the gas flow due to the change of temperature such as fire accident. It is worth to mention that the safety gas controller can only operate under an operation temperature from −20° C. to 50° C. Therefore, the safety gas controller only fits to incorporate with any indoor gas apparatus. In other words, such safety gas controller is unsafe to incorporate with any outdoor gas apparatus.

Furthermore, a timing device is incorporated to selectively control the operation time of the gas controller. The timing device generally comprises a valve body having a pressurized gas chamber provided at the gas channel to communicate the gas outlet, and a timer gear assembly disposed in the gas valve to actuate an actuating arm to shut off the gas channel for a predetermined time preset by the user.

Accordingly, the timer gear assembly is engaged with the actuating arm by glue. However, there is no mechanical engagement to substantially mount the timer gear assembly to the valve body to hold the timer gear assembly within the pressurized gas chamber in position such that the timer gear assembly may misalign with the actuating arm over a period of continuous use, which may cause the failure operation the timing device and the gas leakage of the valve body.

The timer gear assembly comprises a gear unit operatively connected with each other between an upper platform and a lower platform. Accordingly, the upper platform is detachably attached to the lower platform to retain the gear unit therebetween via a screw. However, when the screw is loosen, especially over a period of continuous use, which fails to hold the upper and lower platforms in position, the gear unit cannot fittingly be engaged with each other. In other words, the screw must be tight enough to lock up the gear unit between the upper and lower platforms, which may highly increase the manufacturing cost of the gas controller incorporating with the timing device.

In addition, the setting of the gear unit may accidentally be adjusted by detaching the upper platform from the lower platform which may cause the failure operation of the timer gear assembly. Therefore, the timer gear assembly is disadvantage in practice use.

SUMMARY OF THE PRESENT INVENTION

A main object of the present invention is to provide a timing regulator especially for an outdoor gas apparatus, such as a gas barbecue grill, wherein the timing regulator has a rigid and durable structure that allows to be operated within an operation temperature from −40° C. to 55° C.

Another object of the present invention is to provide a timing regulator, which comprises a safety gas controller for preventing the gas leakage from the gas source, wherein the safety gas controller is adapted to automatically return from a shut-off position back to the normal position. In other words, the timing regulator does not require a manual operation to release the shut-off position of the safety gas controller.

Another object of the present invention is to provide a timing regulator, wherein the safety gas controller comprises a thermal connector which is mounted to the gas outlet and is arranged to be deformed to shut off the gas flow through the gas channel over a safety temperature. In other words, in case of fire, the timing regulator can be automatically shut off to stop the gas flow from the gas source to prevent the gas leakage thereof.

Another object of the present invention is to provide a timing regulator, which comprises a timer device, wherein the upper platform, the lower platform, and the gear unit are securely attached to form a one piece integral unit such that no screw is needed to lock up the upper and lower platforms to retain the gear unit therebetween, so as to prevent the failure operation of the timer device and misalignment of the gear unit due to the loosened screw. In addition, the one piece integral timer device enhances the assembling operation of the timing regulator so as to minimize the manufacturing cost of the timing regulator incorporating with the timer device.

Another object of the present invention is to provide a timing regulator, wherein the timer device is mechanically engaged with the actuating arm to control the gas flow such that the timer device is securely held in position to prevent the failure operation of the timer device and the gas leakage therefrom.

Another object of the present invention is to provide a timing regulator, which comprises a rubber made gas tube, having a predetermined stretching ability, sealedly connected the gas discharging end of the timing regulator via the connecting device so as to prevent the gas leakage at the gas discharging end of the timing regulator in comparison with the conventional gas controller that the gas tube is directly connected to the gas discharging end of the gas controller.

Accordingly, in order to accomplish the above objects, the present invention provides a timing regulator for regulating a gas flow to pass from a gas source to an outdoor gas apparatus, wherein the timing regulator comprises:

a valve body, which is constructed to obtain an operation temperature of the timing regulator from −40° C. to 55° C. for incorporating with the outdoor gas apparatus, having a gas inletting end, a gas discharging end for connecting to the outdoor gas apparatus, and a gas chamber communicating between the gas inletting end and the gas discharging end, wherein the valve body further comprises a safety gas connector provided at the gas inletting end for securely and sealedly connecting to the gas source;

a gas controller comprising a gas channel having a gas outlet communicating with the gas chamber and a gas inlet defining at the gas inletting end of the valve body, and a safety device disposed in the gas channel for blocking the gas flow passing from the gas inlet to the gas outlet when a gas pressure at the gas discharging end of the valve body is higher than a safety gas pressure at the gas inletting end thereof; and a timer device disposed in the valve body for selectively regulating the gas flow via a preset time frame, wherein the timer device comprises:

a time gear assembly comprising an upper platform, a lower platform spacedly supported below the upper platform, and a gear unit supported between the upper and lower platforms to form a one piece integral time gear assembly;

a gas switch which is disposed within the gas chamber of the valve body and is operatively connected with the time gear assembly for controlling the gas flow through the gas chamber; and a manual time switch which is rotatably supported on the valve body and is operatively connected with the gear unit of the time gear assembly, wherein the manual time switch is arranged to actuate the gas switch through the gear unit for blocking the gas flow to pass through the gas chamber so as to shut off the valve body after the preset time frame.

These and other objectives, features, and advantages of the present invention will become apparent from the following detailed description, the accompanying drawings, and the appended claims.

DETAILED DESCRIPTION OF THE PREFERRED EMBODIMENT

Figure 1:
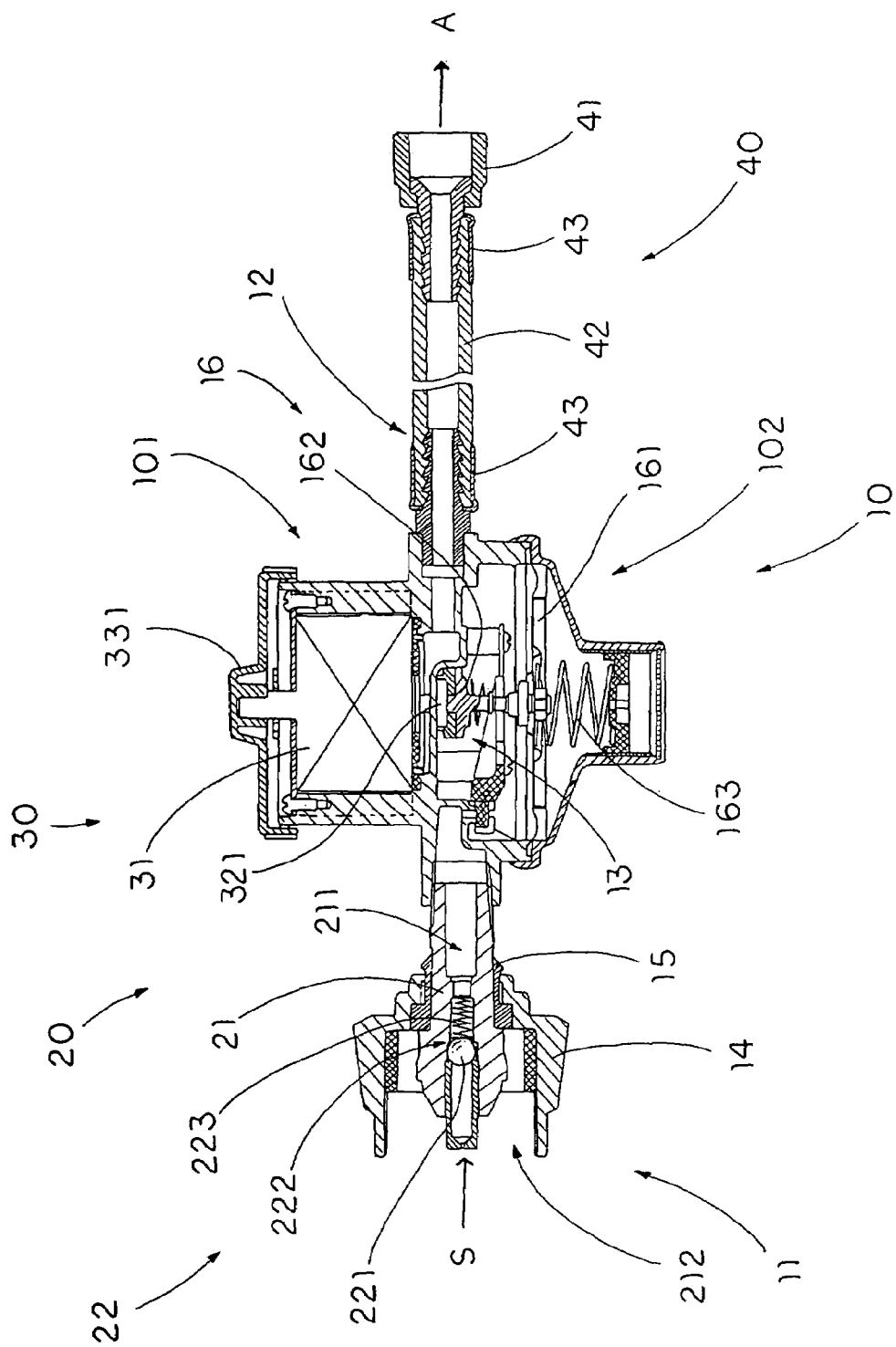
FIG. 1 is a sectional view of a timing regulator according to a preferred embodiment of the present invention.

Referring to FIG. 1 of the drawings, a timing regulator according to the preferred embodiment of the present invention, wherein the timing regulator, which is arranged to operatively connect between a gas source S and an outdoor gas apparatus A to regulate a gas flow to pass from the gas source S to the outdoor gas apparatus A, comprises a valve body 10 and a gas controller 20.

The valve body 10 is constructed to obtain an operation temperature of the timing regulator from −40° C. to 55° C. for incorporating with the outdoor gas apparatus A. The valve body 10 has a gas inletting end 11, a gas discharging end 12 for connecting to the outdoor gas apparatus A, and a gas chamber 13 communicating between the gas inletting end 11 and the gas discharging end 12. The valve body 10 further comprises a safety gas connector 14 provided at the gas inletting end 11 for securely and sealedly connecting to the gas source S.

The gas controller 20 comprises a gas channel 21 having a gas outlet 211 communicating with the gas chamber 13 and a gas inlet 212 defining at the gas inletting end 11 of the valve body 10, and a safety device 22 disposed in the gas channel 21 for blocking the gas flow passing from the gas inlet 212 to the gas outlet 211 when a gas pressure at the gas discharging end 12 of the valve body 10 is higher than a safety gas pressure at the gas inletting end 11 thereof. Accordingly, the gas controller 20 of the timing regulator of the present invention has passed the 'UL-144' test of LP-Gas Regulators so as to reach the safety standard of the gas controller.

The timing regulator further comprises a timer device 30 disposed in the valve body 10 for selectively regulating the gas flow via a preset time frame, wherein the timer device 30 comprises a time gear assembly 31, a gas switch 32, and a manual time switch 33.

The time gear assembly 31 comprises an upper platform 311, a lower platform 312 spacedly supported below the upper platform 311, and a gear unit 313 supported between the upper and lower platforms 311, 312 to form a one piece integral time gear assembly 31.

The gas switch 32 is disposed within the gas chamber 13 of the valve body 10 and is operatively connected with the time gear assembly 31 for controlling the gas flow through the gas chamber 13.

The manual time switch 33 is rotatably supported on the valve body 10 and is operatively connected with the gear unit 313 of the time gear assembly 31, wherein the manual time switch 33 is arranged to actuate the gas switch 32 through the gear unit 313 for blocking the gas flow to pass through the gas chamber 13 so as to shut off the valve body 10 after the preset time frame.

According to the preferred embodiment, the valve body 10, which is made of rigid material such as metal, is constructed to have an upper casing 101 and a lower casing 102 securely attached thereto so as to prevent the valve body 10 from being opened intentionally. It is worth to mention that the secure connection between the upper and lower casings 101, 102 of the valve body 10 is to prevent the user to open the valve body 10 to self-adjust the manufacturing setting of the timing regulator by detaching the upper casing 101 from the lower casing 102, which may cause the failure operation of the timing regulator and the gas leakage thereof.

Figure 2:
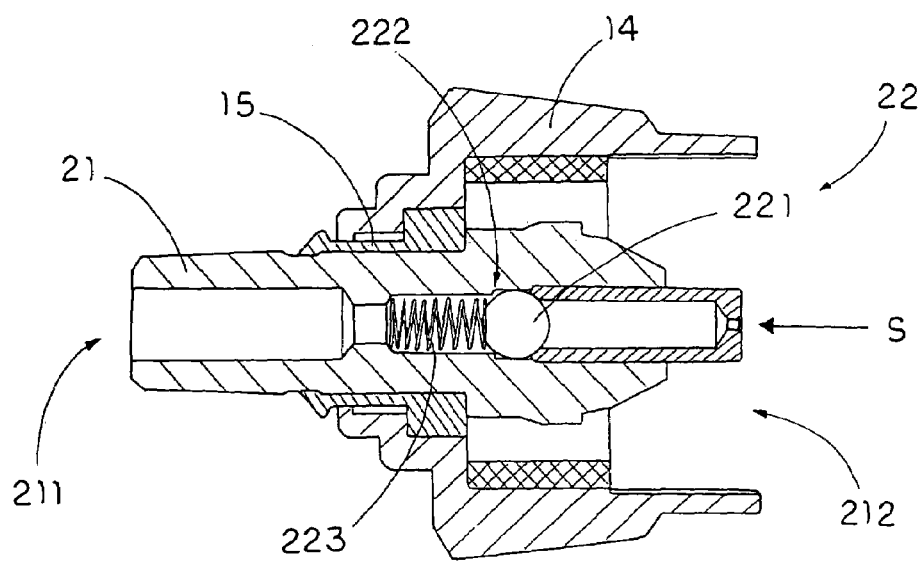
FIG. 2 is a sectional view of a safety gas controller of the timing regulator according to the above preferred embodiment of the present invention.

As shown in FIG. 2, the safety gas connector 14 is mounted at the gas inletting end 11 of the valve body 10 for securely connecting with a gas vent of the gas source S, wherein the safety gas connector 14 has an inner threaded portion 141 adapted for rotatably screwing with an outer threaded portion of the gas vent so as to securely connecting the valve body 10 with the gas source S. It is worth to mention that the gas vent of the gas source S is sealedly concealed within the safety gas connector 14 so as to prevent the gas from leaking through the connection between the gas insetting end 11 and the gas vent of the gas source S. Accordingly, the safety gas connector 14 of the timing regulator of the present invention has passed the 'ANSIZ21.81' test of Cylinder Connection Device so as to reach the safety standard to connect the valve body 10 with the gas source S.

The valve body 10 further comprises a thermal connector 15, having a predetermined thermal contracting ability, connected the safety gas connector 14 at the gas inletting end 11 of the valve body 10, wherein the thermal connector 15 is adapted to be deformed for disengaging the gas inletting end 11 of the valve body 10 with the gas source S when an environmental temperature is higher than a thermal contracting temperature of the thermal connector 15.

Accordingly, the thermal connector 15 is coaxially mounted between the gas inletting end 11 of the valve body 10 and the safety gas connector 14 such that when the thermal connector 15 is deformed to shorten a length thereof, the gas inletting end 11 of the valve body 10 is driven to detach from the gas source S so as to stop the gas flow to pass to the valve body 10. The thermal contracting temperature of the thermal connector 15 is about 240° F. (about 115.6° C.) such that when the environmental temperature is below 240° F. (about 115.6° C.), the valve body 10 is normally connected with the gas source S for allowing the gas flow passing to the valve body 10. Therefore, in case of fire, i.e. the environmental temperature is higher than 240° F. (about 115.6° C.), the thermal connector 15 is physically deformed to shut off the valve body 10 for further enhancing the safety purpose of the timing regulator of the present invention.

The valve body 10 further comprises a gas flowing regulator 16 for controlling the gas flow, wherein the gas flowing regulator 16 comprises a pressurizing diaphragm 161 movably sealing at the gas chamber 13 and a gas valve 162 which is operatively connected to the pressurizing diaphragm 161 and is communicating the gas chamber 13 with the gas outlet 211 of the gas controller 20, in such a manner that while increasing the pressure at the gas discharging end 12 of the valve body 10, the pressurizing diaphragm 161 is lifted to partially close the gas valve 162 for reducing the gas flow to pass to the gas discharging end 12 of the valve body 10, and while reducing the pressure gas discharging end 12 of the valve body 10, the pressurizing diaphragm 161 is sucked to partially open the gas valve 162 for increasing the gas flow to pass to the gas discharging end 12 of the valve body 10. In other words, the gas flow can be controlled by the movement of the pressurizing diaphragm 161 to control the gas valve 162 so as to retain the gas flow in a predetermined pressure.

As shown in FIG. 1, the gas flowing regulator 16 further comprises a compression spring 163 for applying an urging force against the pressurizing diaphragm 161 to selectively adjust the amplitude movement of the pressurizing diaphragm 161 for regulating the gas flow passing through the gas chamber 13.

According to the present invention, the timing regulator of the present invention does not incorporate with a gas flow indicator to illustrate the pressure of the gas flow, so as to minimize the gas flow from leaking through the gas flow indicator. Therefore, the gas flowing regulator 16 can safety reduce and stabilize the gas flow from the relatively high gas pressure of the gas source S to the outdoor gas apparatus A.

The gas controller 20 is extended from the valve body 10 to communicate the gas channel 21 with the gas chamber 13, wherein the gas controller 20 is arranged to guide the gas flow from the gas source S to the gas chamber 13 through the gas channel 21 at the gas outlet 211 thereof.

As shown in FIG. 2, the safety device 22 comprises a ball shaped gas stopper 221 movably disposed within the gas channel 21 between the gas outlet 211 and the gas inlet 212, a sealing ring 222 formed at an inner circumferential surface of the gas channel 21, and a resilient element 223 disposed in the gas channel 21 for applying an urging pressure against the gas stopper 221 to retain the gas stopper 221 at a normal gas flowing position, wherein at the normal gas flowing position, the gas stopper 221 is pushed by the resilient element 223 to move offset from the sealing ring 222 for allowing the gas flow to pass through the gas channel 21 to the gas outlet 211, and at a shut-off position, the gas stopper 221 is moved to sit at the sealing ring 222 for blocking the gas flow to pass through the gas channel 21.

The gas stopper 221, which is preferably made of steel, has a diameter smaller a diameter of the gas channel 21 such that the gas stopper 221 is adapted to be driven by the gas flow to move along the gas channel 21 between the gas outlet 211 and the gas inlet 212.

The sealing ring 222 is integrally formed at the inner circumferential surface of the gas channel 21 such that the sealing ring 22 functions as a stopper to stop the sliding movement of the gas stopper 221 along the gas channel 21 so as to seal the gas channel 21 for blocking the gas flow passing therethrough.

The resilient element 223, according to the preferred embodiment, is a compression spring having two ends biasing against the gas outlet 211 and the gas stopper 221. The resilient element 223 is disposed within the gas channel 21 to normally push the gas stopper 221 away from the sealing ring 222 so as to retain the gas stopper 221 at the normal gas flowing position, i.e. the safety gas pressure at the gas inletting end 11 of the valve body 10. Accordingly, at the shut-off position, i.e. the gas leakage of the timing regulator, the pressure at the gas discharging end 12 of the valve body 10 is extremely higher than the safety gas pressure at the gas inletting end of the valve body 10, the unbalance pressure will suck the gas stopper 221 to seal at the sealing ring 222 so as to block up the gas flow to pass through the gas channel 21.

Once the timing regulator returns to the normal balance pressure, i.e. the safety gas pressure, the compressed resilient element 223 rebounds to its original form to push the gas stopper 221 away the sealing ring 222 so as to allow the gas flow to pass through the gas channel 21. In other words, the safety device 22 provides an automatic operation to control the gas flow such that no manual operation is required to push the gas stopper 221 back to its normal gas flowing position.

Figure 3:
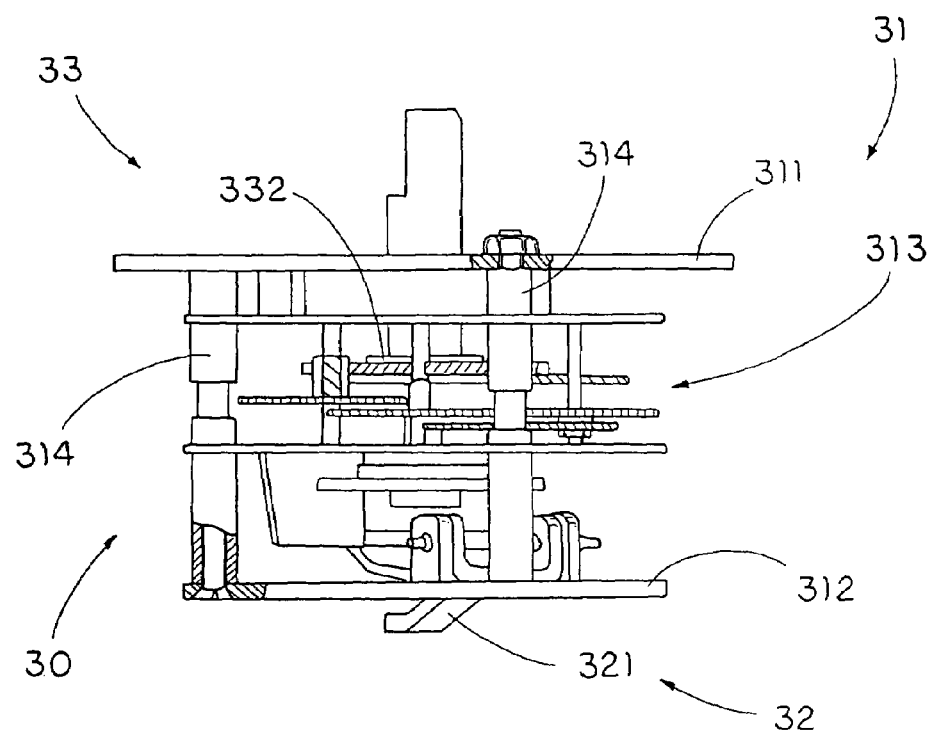
FIG. 3 is a sectional view of a timer device of the timing regulator according to the above preferred embodiment of the present invention.

As shown in FIG. 3, the upper and lower platforms 311, 312, which are made of rigid material such as steel, are spacedly positioned with each other to support the gear unit 313 therebetween. The time gear assembly 31 further comprises a plurality of locking shafts 314 substantially extended from the upper platform 311 to the lower platform 312 to lock up the upper and lower platforms 311, 312 so as to securely retain the gear unit 313 therebetween in a precise engagement manner. In other words, the locking shafts 314 function as lockers to securely lock up the time gear assembly 31 to form a one piece integral member. In addition, when the time gear assembly 31 is formed in a one piece integral member, the time gear assembly 31 is adapted to easily and precisely engage with the gas switch 32, so as to simplify the installation process of the timing regulator of the present invention.

The gear unit 313 is constructed by a plurality of gear elements engaged with each other, wherein each of the gear elements of the gear unit 313 is made of rigid material such as metal to extend the service life of the gear unit 313. It is worth to mention that since the gear unit 313 is locked up between the upper and lower platforms 311, 312, the gear elements of the gear unit 313 can be precisely engaged with each other. In other words, the user is not allow to disassemble the one piece integral time gear assembly 31 to self adjust the engagement of the gear unit 313, which may cause the failure operation of the timer device 30.

The gas switch 32, according to the preferred embodiment, is operatively connected to the gas flowing regulator 16 for controlling the gas flow, wherein the gas switch 32 comprises an actuating arm 321 operatively connected to the gas valve 162 of the gas flowing regulator 16 to adjust the gas valve 162 in an open and close manner.

The manual time switch 33 comprises a turning switch 331 rotatably supported on the valve body 10 for selecting the time frame to operate the gas valve 162, and a coil spring 332 supported between the upper and lower platforms 311, 312 to operatively engage with the gear unit 313 for restoring a coil spring force when the turning switch 331 is driven to rotate. Accordingly, when the turning switch 331 is rotated, a predetermined coil spring force is restored in the coil spring 332. Therefore, while releasing the coil spring force from the coil spring 332, the gear unit 313 is driven to operate until the coil spring force is totally released.

According to the preferred embodiment, the timer device 30 provides different time settings for the timing regulator of the present invention. The timer device 30 is adapted to select between an 'ON' mode, an 'OFF' mode, and a 'time frame' mode. When the turning switch 331 is rotatably switched at the 'ON' mode, the actuating arm 321 of the gas switch 32 actuates to the gas valve 162 of the gas flowing regulator 16 for allowing the gas flow to pass to the gas discharging end 12 of the valve body 10 through the gas chamber 13. When the turning switch 331 is rotatably switched at the 'OFF' mode, the actuating arm 321 of the gas switch 32 actuates to the gas valve 162 of the gas flowing regulator 16 to shut off the gas valve 162 for blocking the gas flow through the gas chamber 13.

When the turning switch 331 is rotatably switched at the 'time frame' mode, a predetermined coil spring force is restored via the coil spring 332 to drive the gear unit 313 to operate within the preset time frame. For example, when the turning switch 331 is rotatably switched at ten-minute time frame, the coil spring 332 restores a predetermined coil spring force enough that the actuating arm 321 of the gas switch 32 to actuate the gas valve 162 of the gas flowing regulator 16 for allowing the gas flow to pass through the gas chamber 13 for ten minutes. In other words, after ten minutes, the actuating arm 321 of the gas switch 32 actuates to shut off the gas valve 162 of the gas flowing regulator 16 for blocking the gas flow to pass through the gas chamber 13.

As shown in FIG. 1, the timing regulator further comprise a gas extension 40 extended from the gas discharging end 12 of the valve body 10 for securely and sealedly connecting to the outdoor gas apparatus A. The gas extension 40 comprises a gas adapter 41 for securely connecting with a gas entrance of the outdoor gas apparatus A, and a rubber made gas tube 42 having two ends securely connecting with the gas discharging end 12 of the valve body 10 and the gas adapter 41 respectively for guiding the gas flow to pass from the valve body 10 to the outdoor gas apparatus A.

The gas adapter 41 has an inner threaded portion adapted for sealedly screwing with an outer threaded portion of the gas entrance of the outdoor gas apparatus A for securely connecting the gas extension 40 to the outdoor gas apparatus A.

The gas tube 42 is securely connected between the valve body 10 and the gas adapter 41 via two securing lockers 43 to lock up the two ends of the gas tube 42 at the gas discharging end 12 of the valve body 10 and the gas adapter 41 respectively. Accordingly, the gas tube 42 of the gas extension 40 has passed the 'UL-569' test to reach the safety standard of the rubber made gas tube for ensure the stretchability of the gas tube 42.

According to the present invention, the timing regulator has already approved the Canadian Standard Association (CSA), American Gas Association (AGA), and Canadian Gas Association (CGA). Therefore, the timing regulator of the present invention is adapted to safety connect the gas source S to the outdoor gas apparatus A for regulating the gas flow through the timing regulator. It is worth to the timing regulator is adapted to regulate the gas flow from the L.P.G container of the gas source S having an internal gas pressure about 6 Bar to the outdoor gas apparatus A having a gas pressure about 11" W.C. In addition, the timing regulator of the present invention is especially designed for the outdoor gas apparatus A because the operation temperature of the timing regulator from −40° C. to 55° C. in comparison with the conventional gas regulator that can only operate from −20° C. to 50° C.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A timing regulator for regulating a gas flow to pass from a gas source to an outdoor gas apparatus, wherein said timing regulator comprises:

a valve body, which has a predetermined range of operation temperature for incorporating with said outdoor gas apparatus in a safety manner, having a gas inletting end, a gas discharging end for connecting to said outdoor gas apparatus, and a gas chamber communicating between said gas inletting end and said gas discharging end, wherein said valve body further comprises a safety gas connector provided at said gas inletting end for securely and sealedly connecting to said gas source;

a gas controller comprising a gas channel having a gas outlet communicating with said gas chamber and a gas inlet defining at said gas inletting end of said valve body, and a safety device disposed in said gas channel for blocking said gas flow passing from said gas inlet to said gas outlet when a gas pressure at said gas discharging end of said valve body is higher than a safety gas pressure at said gas inletting end thereof; and a timer device disposed in said valve body for selectively regulating said gas flow via a preset time frame, wherein said timer device comprises:

a time gear assembly comprising an upper platform, a lower platform spacedly supported below said upper platform, and a gear unit supported between said upper and lower platforms to form a one piece integral time gear assembly;

a gas switch which is disposed within said gas chamber of said valve body and is operatively connected with said time gear assembly for controlling said gas flow through said gas chamber; and a manual time switch which is rotatably supported on said valve body and is operatively connected with said gear unit of said time gear assembly, wherein said manual time switch is arranged to actuate said gas switch through said gear unit for blocking said gas flow to pass through said gas chamber so as to shut off said valve body after said preset time frame.

2. The timing regulator, as recited in claim 1, wherein said safety gas connector is mounted at said gas inletting end of said valve body 10 for securely connecting with a gas vent of said gas source, wherein said safety gas connector has an inner threaded portion adapted for rotatably screwing with an outer threaded portion of said gas vent so as to securely connecting said valve body with said gas source.

3. The timing regulator, as recited in claim 1, wherein said valve body further comprises a thermal connector, having a predetermined thermal contracting ability, connected between said safety gas connector and said gas inletting end of said valve body, wherein said thermal connector is adapted to be deformed for disengaging said gas inletting end of said valve body with said gas source when an environmental temperature is higher than a thermal contracting temperature of said thermal connector.

4. The timing regulator, as recited in claim 2, wherein said valve body further comprises a thermal connector, having a predetermined thermal contracting ability, connected between said safety gas connector and said gas inletting end of said valve body, wherein said thermal connector is adapted to be deformed for disengaging said gas inletting end of said valve body with said gas source when an environmental temperature is higher than a thermal contracting temperature of said thermal connector.

5. The safety regulator, as recited in claim 3, wherein said thermal contracting temperature of said thermal connector is 240° F. in such a manner that when said environmental temperature is higher than said thermal contracting temperature, said thermal connector is physically deformed to shut off said valve body.

6. The safety regulator, as recited in claim 4, wherein said thermal contracting temperature of said thermal connector is 240° F. in such a manner that when said environmental temperature is higher than said thermal contracting temperature, said thermal connector is physically deformed to shut off said valve body.

7. The safety regulator, as recited in claim 1, wherein said valve body further comprises a gas flowing regulator for controlling said gas flow, wherein said gas flowing regulator comprises a pressurizing diaphragm movably sealing at said gas chamber and a gas valve which is operatively connected to said pressurizing diaphragm and is communicating said gas chamber with said gas outlet of said gas controller, in such a manner that while increasing said pressure at said gas discharging end of said valve body, said pressurizing diaphragm is lifted to partially close said gas valve for reducing said gas flow to pass to said gas discharging end of said valve body, and while reducing said pressure gas discharging end of said valve body, said pressurizing diaphragm is sucked to partially open said gas valve for increasing said gas flow to pass to said gas discharging end of said valve body.

8. The safety regulator, as recited in claim 3, wherein said valve body further comprises a gas flowing regulator for controlling said gas flow, wherein said gas flowing regulator comprises a pressurizing diaphragm movably sealing at said gas chamber and a gas valve which is operatively connected to said pressurizing diaphragm and is communicating said gas chamber with said gas outlet of said gas controller, in such a manner that while increasing said pressure at said gas discharging end of said valve body, said pressurizing diaphragm is lifted to partially close said gas valve for reducing said gas flow to pass to said gas discharging end of said valve body, and while reducing said pressure gas discharging end of said valve body, said pressurizing diaphragm is sucked to partially open said gas valve for increasing said gas flow to pass to said gas discharging end of said valve body.

9. The safety regulator, as recited in claim 6, wherein said valve body further comprises a gas flowing regulator for controlling said gas flow, wherein said gas flowing regulator comprises a pressurizing diaphragm movably sealing at said gas chamber and a gas valve which is operatively connected to said pressurizing diaphragm and is communicating said gas chamber with said gas outlet of said gas controller, in such a manner that while increasing said pressure at said gas discharging end of said valve body, said pressurizing diaphragm is lifted to partially close said gas valve for reducing said gas flow to pass to said gas discharging end of said valve body, and while reducing said pressure gas discharging end of said valve body, said pressurizing diaphragm is sucked to partially open said gas valve for increasing said gas flow to pass to said gas discharging end of said valve body.

10. The timing regulator, as recited in claim 1, wherein said safety device comprises a ball shaped gas stopper movably disposed within said gas channel between said gas outlet and said gas inlet, a sealing ring formed at an inner circumferential surface of said gas channel, and a resilient element disposed in said gas channel for applying an urging pressure against said gas stopper to retain said gas stopper at a normal gas flowing position, wherein at said normal gas flowing position, said gas stopper is pushed by said resilient element to move offset from said sealing ring for allowing said gas flow to pass through said gas channel to said gas outlet, and at a shut-off position, said gas stopper is moved to sit at said sealing ring for blocking said gas flow to pass through said gas channel.

11. The timing regulator, as recited in claim 3, wherein said safety device comprises a ball shaped gas stopper movably disposed within said gas channel between said gas outlet and said gas inlet, a sealing ring formed at an inner circumferential surface of said gas channel, and a resilient element disposed in said gas channel for applying an urging pressure against said gas stopper to retain said gas stopper at a normal gas flowing position, wherein at said normal gas flowing position, said gas stopper is pushed by said resilient element to move offset from said sealing ring for allowing said gas flow to pass through said gas channel to said gas outlet, and at a shut-off position, said gas stopper is moved to sit at said sealing ring for blocking said gas flow to pass through said gas channel.

12. The timing regulator, as recited in claim 6, wherein said safety device comprises a ball shaped gas stopper movably disposed within said gas channel between said gas outlet and said gas inlet, a sealing ring formed at an inner circumferential surface of said gas channel, and a resilient element disposed in said gas channel for applying an urging pressure against said gas stopper to retain said gas stopper at a normal gas flowing position, wherein at said normal gas flowing position, said gas stopper is pushed by said resilient element to move offset from said sealing ring for allowing said gas flow to pass through said gas channel to said gas outlet, and at a shut-off position, said gas stopper is moved to sit at said sealing ring for blocking said gas flow to pass through said gas channel.

13. The timing regulator, as recited in claim 9, wherein said safety device comprises a ball shaped gas stopper movably disposed within said gas channel between said gas outlet and said gas inlet, a sealing ring formed at an inner circumferential surface of said gas channel, and a resilient element disposed in said gas channel for applying an urging pressure against said gas stopper to retain said gas stopper at a normal gas flowing position, wherein at said normal gas flowing position, said gas stopper is pushed by said resilient element to move offset from said sealing ring for allowing said gas flow to pass through said gas channel to said gas outlet, and at a shut-off position, said gas stopper is moved to sit at said sealing ring for blocking said gas flow to pass through said gas channel.

14. The timing regulator, as recited in claim 1, wherein said time gear assembly further comprises a plurality of locking shafts substantially extended from said upper platform to the lower platform to lock up said upper and lower platforms to form said time gear assembly in an one piece integral member so as to securely retain said gear unit therebetween in a precise engagement manner.

15. The timing regulator, as recited in claim 4, wherein said time gear assembly further comprises a plurality of locking shafts substantially extended from said upper platform to the lower platform to lock up said upper and lower platforms to form said time gear assembly in an one piece integral member so as to securely retain said gear unit therebetween in a precise engagement manner.

16. The timing regulator, as recited in claim 9, wherein said time gear assembly further comprises a plurality of locking shafts substantially extended from said upper platform to the lower platform to lock up said upper and lower platforms to form said time gear assembly in an one piece integral member so as to securely retain said gear unit therebetween in a precise engagement manner.

17. The timing regulator, as recited in claim 13, wherein said time gear assembly further comprises a plurality of locking shafts substantially extended from said upper platform to the lower platform to lock up said upper and lower platforms to form said time gear assembly in an one piece integral member so as to securely retain said gear unit therebetween in a precise engagement manner.

18. The timing regulator, as recited in claim 14, wherein said manual time switch comprises a turning switch rotatably supported on said valve body for selecting said time frame to operate said gas valve, and a coil spring supported between said upper and lower platforms to operatively engage with said gear unit, wherein said coil spring is adapted for restoring a coil spring force against said gear unit when said turning switch is driven to rotate.

19. The timing regulator, as recited in claim 15, wherein said manual time switch comprises a turning switch rotatably supported on said valve body for selecting said time frame to operate said gas valve, and a coil spring supported between said upper and lower platforms to operatively engage with said gear unit, wherein said coil spring is adapted for restoring a coil spring force against said gear unit when said turning switch is driven to rotate.

20. The timing regulator, as recited in claim 16, wherein said manual time switch comprises a turning switch rotatably supported on said valve body for selecting said time frame to operate said gas valve, and a coil spring supported between said upper and lower platforms to operatively engage with said gear unit, wherein said coil spring is adapted for restoring a coil spring force against said gear unit when said turning switch is driven to rotate.

21. The timing regulator, as recited in claim 17, wherein said manual time switch comprises a turning switch rotatably supported on said valve body for selecting said time frame to operate said gas valve, and a coil spring supported between said upper and lower platforms to operatively engage with said gear unit, wherein said coil spring is adapted for restoring a coil spring force against said gear unit when said turning switch is driven to rotate.

22. The timing regulator, as recited in claim 1, further comprising a gas extension extended from said gas discharging end of said valve body for securely and sealedly connecting to said outdoor gas apparatus, wherein said gas extension comprises a gas adapter for securely connecting with a gas entrance of said outdoor gas apparatus, and a rubber made gas tube having two ends securely connecting with said gas discharging end of said valve body and said gas adapter respectively for guiding said gas flow to pass from said valve body to said outdoor gas apparatus.

23. The timing regulator, as recited in claim 6, further comprising a gas extension extended from said gas discharging end of said valve body for securely and sealedly connecting to said outdoor gas apparatus, wherein said gas extension comprises a gas adapter for securely connecting with a gas entrance of said outdoor gas apparatus, and a rubber made gas tube having two ends securely connecting with said gas discharging end of said valve body and said gas adapter respectively for guiding said gas flow to pass from said valve body to said outdoor gas apparatus.

24. The timing regulator, as recited in claim 13, further comprising a gas extension extended from said gas discharging end of said valve body for securely and sealedly connecting to said outdoor gas apparatus, wherein said gas extension comprises a gas adapter for securely connecting with a gas entrance of said outdoor gas apparatus, and a rubber made gas tube having two ends securely connecting with said gas discharging end of said valve body and said gas adapter respectively for guiding said gas flow to pass from said valve body to said outdoor gas apparatus.

25. The timing regulator, as recited in claim 21, further comprising a gas extension extended from said gas discharging end of said valve body for securely and sealedly connecting to said outdoor gas apparatus, wherein said gas extension comprises a gas adapter for securely connecting with a gas entrance of said outdoor gas apparatus, and a rubber made gas tube having two ends securely connecting with said gas discharging end of said valve body and said gas adapter respectively for guiding said gas flow to pass from said valve body to said outdoor gas apparatus.

26. The timing regulator, as recited in claim 22, wherein said gas adapter has an inner threaded portion adapted for sealedly screwing with an outer threaded portion of said gas entrance of said outdoor gas apparatus for securely connecting said gas extension to said outdoor gas apparatus.

27. The timing regulator, as recited in claim 23, wherein said gas adapter has an inner threaded portion adapted for sealedly screwing with an outer threaded portion of said gas entrance of said outdoor gas apparatus for securely connecting said gas extension to said outdoor gas apparatus.

28. The timing regulator, as recited in claim 24, wherein said gas adapter has an inner threaded portion adapted for sealedly screwing with an outer threaded portion of said gas entrance of said outdoor gas apparatus for securely connecting said gas extension to said outdoor gas apparatus.

29. The timing regulator, as recited in claim 25, wherein said gas adapter has an inner threaded portion adapted for sealedly screwing with an outer threaded portion of said gas entrance of said outdoor gas apparatus for securely connecting said gas extension to said outdoor gas apparatus.

* * * * *